United States Patent
Tseng et al.

(10) Patent No.: US 9,602,659 B2
(45) Date of Patent: Mar. 21, 2017

(54) PORTABLE DEVICE WITH COMMUNICATION RECORD RECURRING MODULE

(71) Applicants: Horng-Huei Tseng, Hsinchu (TW); Kuo-Ching Chiang, New Taipei (TW)

(72) Inventors: Horng-Huei Tseng, Hsinchu (TW); Kuo-Ching Chiang, New Taipei (TW)

(73) Assignee: Mass International Co., Ltd., Apia (WS)

( * ) Notice: Subject to any disclaimer, the term of this patent is extended or adjusted under 35 U.S.C. 154(b) by 0 days.

(21) Appl. No.: 14/662,247

(22) Filed: Mar. 19, 2015

(65) Prior Publication Data

US 2016/0277568 A1  Sep. 22, 2016

(51) Int. Cl.
*H04M 1/725* (2006.01)
*H04M 3/42* (2006.01)
*H04M 3/22* (2006.01)
*H04M 1/00* (2006.01)

(52) U.S. Cl.
CPC ......... *H04M 3/42221* (2013.01); *H04M 1/00* (2013.01); *H04M 3/2218* (2013.01); *H04M 2203/301* (2013.01); *H04M 2203/305* (2013.01)

(58) Field of Classification Search
CPC .. H04M 3/42221; H04M 3/2218; H04M 1/00; H04M 2203/201; H04M 2203/305

USPC ................ 455/412.1, 414.1, 415, 418, 550.1
See application file for complete search history.

(56) References Cited

U.S. PATENT DOCUMENTS

| | | | |
|---|---|---|---|
| 8,837,317 B1 * | 9/2014 | Oroskar | H04W 36/0072 370/252 |
| 2007/0028191 A1 * | 2/2007 | Tsuji | G06F 3/0485 715/856 |
| 2009/0259493 A1 * | 10/2009 | Venon | G06F 19/322 705/3 |
| 2012/0089895 A1 * | 4/2012 | Ishii | H04M 1/72583 715/205 |
| 2012/0276867 A1 * | 11/2012 | McNamee | H04L 12/1407 455/406 |
| 2014/0310045 A1 * | 10/2014 | Meltzer | G06Q 10/1095 705/7.19 |
| 2015/0195401 A1 * | 7/2015 | Shim | H04M 3/42068 455/414.1 |
| 2016/0095049 A1 * | 3/2016 | Fan | H04W 48/16 370/254 |

* cited by examiner

*Primary Examiner* — Khai M Nguyen
(74) *Attorney, Agent, or Firm* — Chih Feng Yeh; Huntington IP Consulting Co., Ltd.

(57) ABSTRACT

A portable device with communication record recurring module is proposed. It allows phone records of the portable device recurring by the communication record recurring module. The communication record recurring module is capable of recurring phone records of the portable device. The recurring number of the phone records can be set as a per-determined number, and sequential order of the phone records is arranged by chronological sequence.

20 Claims, 10 Drawing Sheets

PORTABLE DEVICE WITH COMMUNICATION RECORD RECURRING MODULE

TECHNICAL FIELD

The present invention relates to a portable device, and more particularly, to a portable device with a communication record recurring module for recurring phone records of the portable device.

BACKGROUND

Because of the development of the information technology (IT), the information could be exchanged with higher capacity and faster speed. Internet is designed as an open structure to exchange information freely without restriction. The third generation mobile phone standard allows the user access video communication through air. Thus, certain communication service requiring real time information exchange, such as viewing live video, has become feasible through mobile phone communication network or Internet. Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone. In pace with the development of information and computer technology, the electronic products grow rapidly with the trend of small size, multifunction and high operation speed. Based on the development of cellular integration technology, communication systems have also been introduced to allow users obtain information more convenient. Thus, the business accompanied with the communication device flourish as well due to the development of the communication technology. The internet and communication service providers also offer business services to assist clients to transfer information or extend the market. The cellular manufactures have to release new models with different appearances, function and styles more frequently so as to attract the attention of the buyer and occupy a favorable marketing share. Communication services providers or information services providers also have to provide diverse, comprehensive and latest information to clients.

Wireless device makers have supported storing name and phone records to wireless devices in order to aid a user in recalling the telephone number among other devices.

However, phone records of mobile terminal are limited and fixed for user's searching. Thus, the present invention is introduced to overcome aforementioned shortcoming.

SUMMARY

The present application proposes a portable device with phone record recurring module which is capable of recurring the pre-determined number phone records by a phone record recurring module such that phone records of the portable device can be recurred without interrupting.

According to one aspect of the invention, a portable device comprises a control unit, and a display coupled to the control unit. A touch screen is capable of supporting multiple functional icons. A communication record recurring module is coupled to the control unit and being capable of recurring communication records of the portable device. The recurring number of the communication records can be set as a per-determined number. The communication records include phone records. A memory is coupled to the control unit to store the communication record recurring module. A microphone is coupled to the control unit. The total number of the communication records is grouped as multiple groups recurred number communication records.

The portable device is a cell phone, a smart phone, a Personal Digital Assistant or a tablet.

According to another aspect of the invention, sequential order of the phone records is arranged by chronological sequence. The portable device further comprises a wireless data transferring module, an image capture module coupled to the control unit.

According to yet another aspect of the invention, the portable device further comprises a rear side touch panel coupled to the control unit for rear side input to control the communication record recurring module.

According to an aspect of the invention, the portable device comprises a control unit, and a display having a front side touch panel and being coupled to the control unit. A touch screen is capable of supporting multiple functional icons. A memory is coupled to the control unit, wherein the memory includes communication records, and a most recent record of the communication records is arranged at the lower portion of the display. A communication record recurring module is coupled to the control unit and being capable of recurring the communication records of the portable device.

The foregoing and other objects, features, and advantages of the invention will become more apparent from the following detailed description, which proceeds with reference to the accompanying figures.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
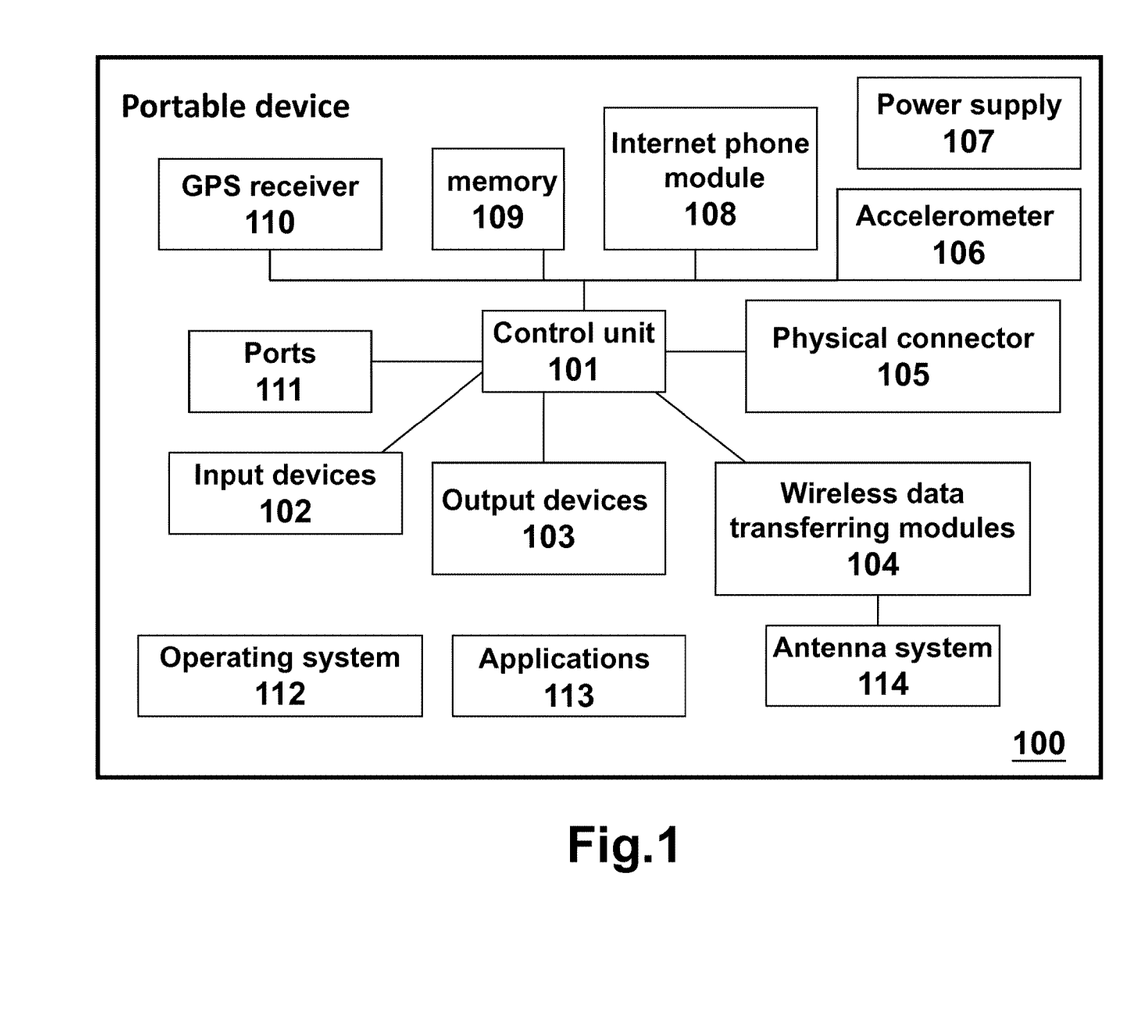
FIG. 1 is an example of a portable device of the present invention.

FIG. 1 is a functional diagram depicting an exemplary portable device 100 including a variety of optional hardware and software components. Any components in the mobile device can communicate with any other component, although not all connections are shown, for ease of illustration. The portable device 100 can be any of a variety of computing devices (e.g., cell phone, smart phone, Personal Digital Assistant (PDA), tablet etc.) and can allow wireless two-way communications with one or more mobile communications networks, such as a cellular or satellite network.

The illustrated portable device 100 can include a controller (control IC) or processor 101 (e.g., signal processor, microprocessor, ASIC, or other control and processing logic circuitry) for performing such tasks as signal coding, data processing, input/output processing, power control, and/or other functions. An operating system 112 can control the allocation and usage of the components and support for one or more application programs 113. The application programs 113 can include common mobile computing applications (e.g., email applications, calendars, contact managers, web browsers, messaging applications), or any other computing application.

The illustrated portable device 100 can include memory 109 which can include non-removable memory and/or removable memory. The non-removable memory can include RAM, ROM, flash memory, a hard disk, or other well-known memory storage technologies. The removable memory can include flash memory or a Subscriber Identity Module (SIM) card, which is well known in GSM communication systems, or other well-known memory storage technologies, such as "smart cards". The memory can be used for storing data and/or code for running the operating system 112 and the applications 113. Example data can include web pages, text, images, sound files, video data, or other data sets to be sent to and/or received from one or more network servers or other devices via one or more wired or wireless networks. The memory can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Figure 2:
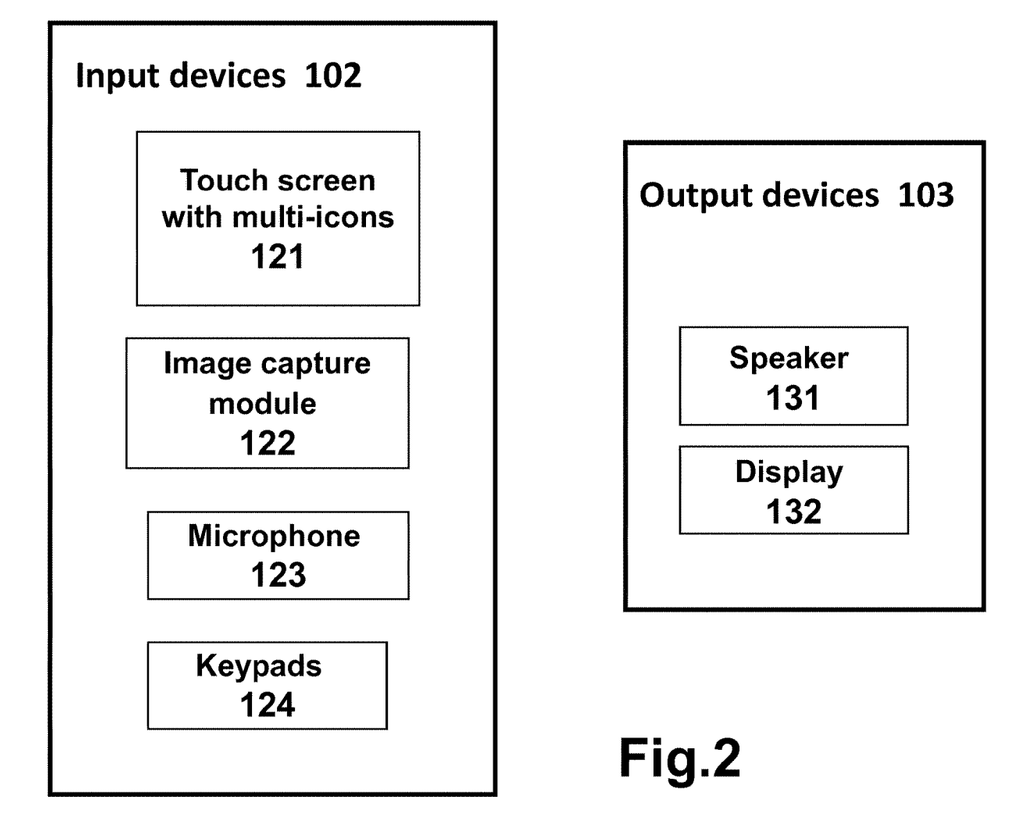
FIG. 2 illustrates input devices/output devices of the FIG. 1.

The portable device 100 can support one or more input devices 102, such as a touch screen 121, camera 122, microphone 123 and keypads 124, and one or more output devices 103, such as a speaker 131 and a display 132, shown in FIG. 2. Some devices can serve more than one input/output function. For example, touch screen 121 and display 132 can be combined in a single input/output device. The touch screen 121 can support multiple functional icons. The icons can be displayed on a home (touch) screen, which is typically the screen displayed when the portable device is powered on. The home screen is the base screen that generally cannot be further minimized and that contains icons representing applications. As further described below, each icon is represented by an image based on its respective application.

The portable terminal or device 100 includes at least one wireless data transferring modules 104. The first wireless data transferring module 104 could be video RF module to transmit or receive mobile phone signal and it is well known in the art. As known in the art, the RF unit is coupled to an antenna system 114. The RF module may include base band processor and so on. This antenna is connected to a transceiver, which is used to receive and transmit signal. The first wireless data transferring modules 104 is compatible to the mobile phone protocol such as W-CDMA CDMA2000 CDMA2001 TD-CDMA TD-SCDMA UWC-136 DECT 4G system. There systems allow the user communicates with video communication. The RF module may perform the function of signal transmitting and receiving, frequency synthesizing, base-band processing and digital signal processing. The SIM card hardware interface is used for receiving a SIM card. Finally, the signal is send to the final actuators, i.e. a vocal I/O unit 131 including a loudspeaker and a microphone. The module 104 can be formed by separated module (chip) or integrated chip. A wireless data transferring module 104 can be coupled to an antenna and can support two-way communications between the processor 101 and external devices, as is well understood in the art.

The device 100 further includes the second wireless data transferring module 104. In one embodiment, a wireless local area network (WLAN) module is employed and it could be compatible to the local area network protocol or standard such as Bluetooth standard, Wi-Fi standard, or 802.11x (x refers to a, b, g, n) standard compatible module. Further, the wireless local area network (WLAN) module could be compatible to the WiMAX (Worldwide Interoperability for Microwave Access) standard or specification. An Internet phone module 130 are coupled to the central control unit 101 to allow transmit and receive the audio, video or both type signal to/from the internet network through the wireless local area wireless transmission module. Internet phone module 108 at least meets the standard of terminal-terminal Voice Over Internet Protocol (VoIP). One of the examples is Skype compatible protocol. By using of the Internet phone module 130 and the wireless local area network module 200B, the user may portably, synchronously transmit and receive the vocal, video or both signal through the internet by using the internet (software) phone module 130. The present invention defines a hand-held device having VoIP phone module and wireless WiFi or WiMax network linking module coupled to the VoIP phone module to allow the user to make a wireless terminal-terminal VoIP phone without power on the PC. The voice over internet protocol (VoIP) phone module is used to encode or convert the voice signal into VoIP protocol within the portable communication device before transmitting the signal, followed by programming the signal into WiFi or WiMax format in order to transmit the voice signal through the wireless network, especially, the Skype phone.

The portable device 100 can further include at least one input/output port 111, a power supply 107, a satellite navigation system receiver 110, such as a Global Positioning System (GPS) receiver, an accelerometer 106, and/or a physical connector 105, which can be a USB port, IEEE 1394 (FireWire) port, and/or RS-232 port. The illustrated components are not required or all-inclusive, as any components can be deleted and other components can be added. For example, the device 100 may include DSP, CODEC (not shown) and A/D converter as well.

An image capturing module 122 is required and coupled to the central control unit 101 to catch the video image if the user would like to conduct the real-time video transmission. The image capturing module 122 could be digital still camera, digital video camera. Therefore, the real-time portable conference is possible. In another embodiment, the one difference is that the device may omit the RF module. If the device 100 includes 3G or higher level RF module, the user may transmit the video phone through the air. Therefore, the user may select one of the schemes to make a video call through internet or air depending on the user demand. If the device is within the hot spot area, the user may choose the usage of the internet phone module for communication due to cheaper transmitting fee. If the out of the hot spot range, the other option for video communication is provided. Typically, the WCDMA signal is less restricted by the geography limitation, but the transmission fee is higher. The present invention allows the user to select the proper wireless module for video communication. If the user would like to conduct the video communication through WiFi or WiMax, the method includes coupling to internet or hot spot, followed by activating the internet (software) phone module. Subsequently, vocal signal is input from the speaker and image data is captured from the image capture device, subsequently, the image data and the vocal signal are converted from signal to digital. After the conversion, the image data and the vocal signal are composition, compressed or processed to form a data streams. The touch screen 121 can support multiple functional icons.

Figure 3:
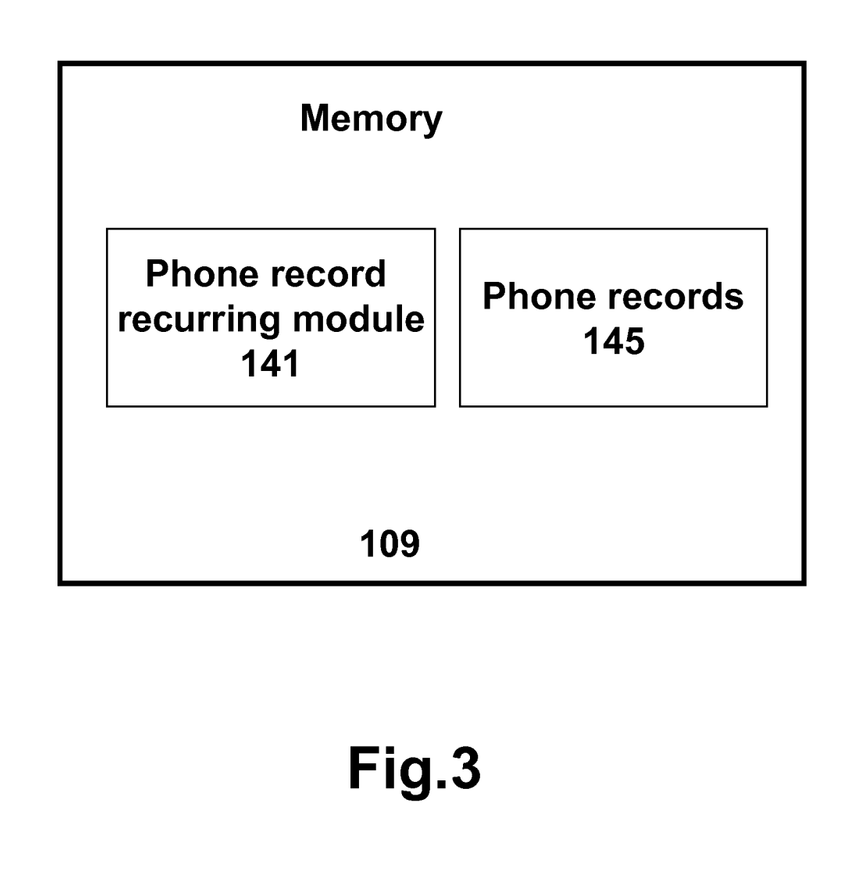
FIG. 3 illustrates a phone record recurring module stored in memory according to one embodiment of the present invention.
Figure 4:
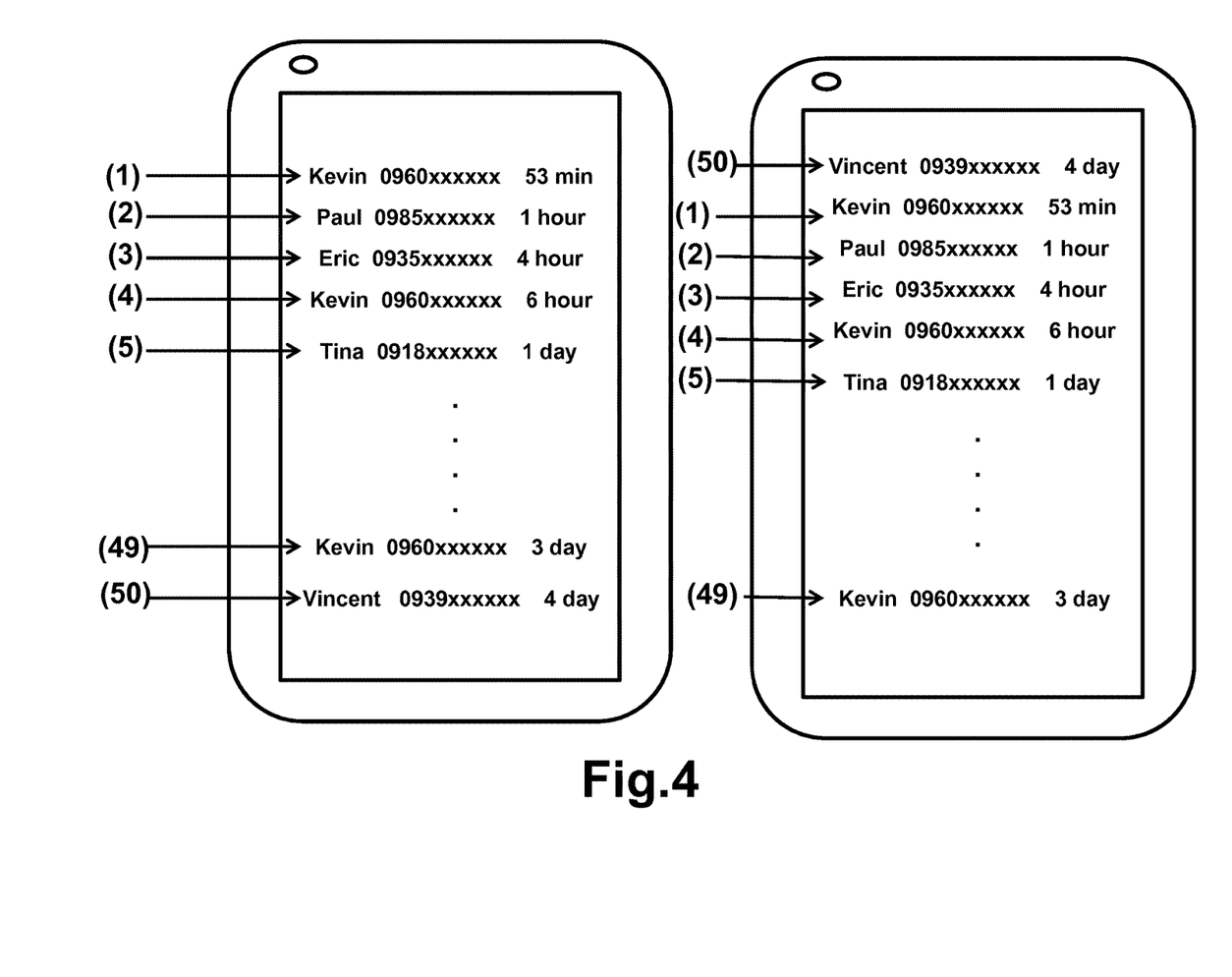
FIG. 4 illustrates phone records displayed on a display according to one embodiment of the present invention.
Figure 5:
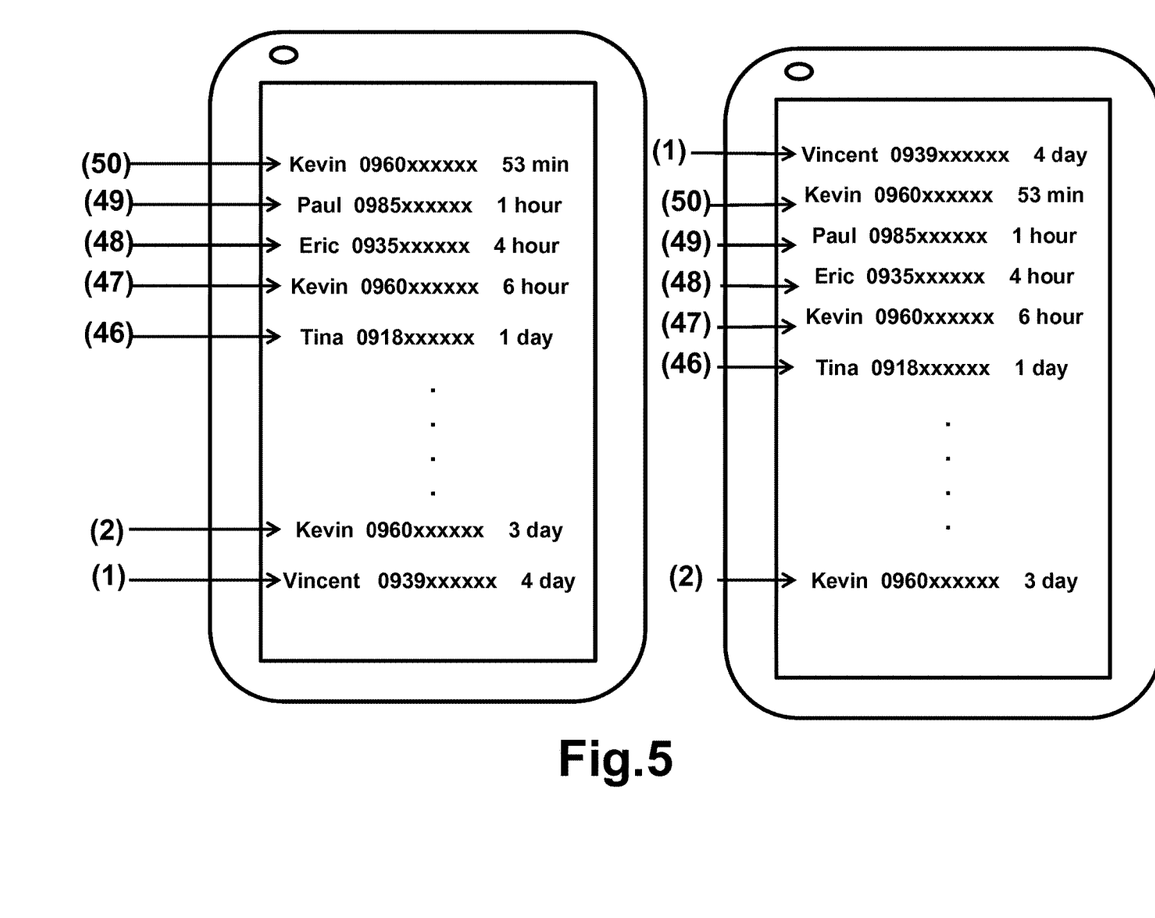
FIG. 5 illustrates phone records displayed on a display according to one embodiment of the present invention.

The portable device 100 includes a communication record recurring module 141 for recurring communication records (such as phone records, short message service records) of the portable device. In one embodiment, the communication record recurring module 141 is stored in the memory 109, shown in FIG. 3. In one embodiment, the communication records may be also stored in the memory 109. For example, recurring number of phone records of communication of the portable device is set as 50. Of course, total phone records may be larger or smaller than the recurring number. The content of the phone records display on the display 132 and sequential order (1), (2), (3), (4), (5) . . . (49) and (50) of the phone records is arranged from top to bottom of the list of the phone records displayed on the display. The sequential order of the phone records is arranged by chronological sequence. For example, a most recent phone record (1) of the phone records is arranged (set as) at the upper portion of the display or the first of list of the phone records (data), shown in FIG. 4. It is convenient for a thumb of the corresponding hand touching the most recent phone record (1) on the front side of the touch screen. In another example, a most recent phone record (1) of the phone records is arranged (set as) at the lower portion of the display or the last of list of the phone records (data), shown in FIG. 5. Based-on the communication record recurring module 141, sequential order (1), (2), (3), (4), (5) . . . (49) and (50) of the phone records can be recurred. There is no last phone record (50) stopped on the list of the phone records. By page scrolling up or down on the touch screen, sequential order (1), (2), (3), (4), (5) . . . (49) and (50) of the phone records can be recurred without interrupting. For example, by page scrolling down on the touch screen, sequential order (50), (1), (2), (3), (4), (5) . . . and (49) of the phone records sequential order (1), (50), (49), (48), (47) . . . and (2) of the phone records are displayed, shown on right side of FIG. 4 and FIG. 5 respectively. The phone records under recurring may be set in one page or several pages. Therefore, the recurring procedure may be performed by one page or several pages.

In one embodiment, recurring number of the phone records listed on the display can be set as a constant number or a per-determined number, for example 30 or 50. When the current total number of the phone number exceeds to the recurring number of the phone number, sequential order of the phone records can be always recurred in the most recent phone records by recurring number. Total number of the phone records can be grouped as multiple groups recurred number phone records. For example, when the total number of the phone number is 50 and the recurring number of the phone number is set as 30, sequential order (1)~(30) of the phone records lists the latest thirty phone records on the first group recurred number phone records and sequential order (31)~(50) of the phone records lists the later twenty phone records on the second group recurred number phone records. Group of the recurred number phone records can be selected, such as by touching a select indication on the touch panel of front display.

Figure 6:
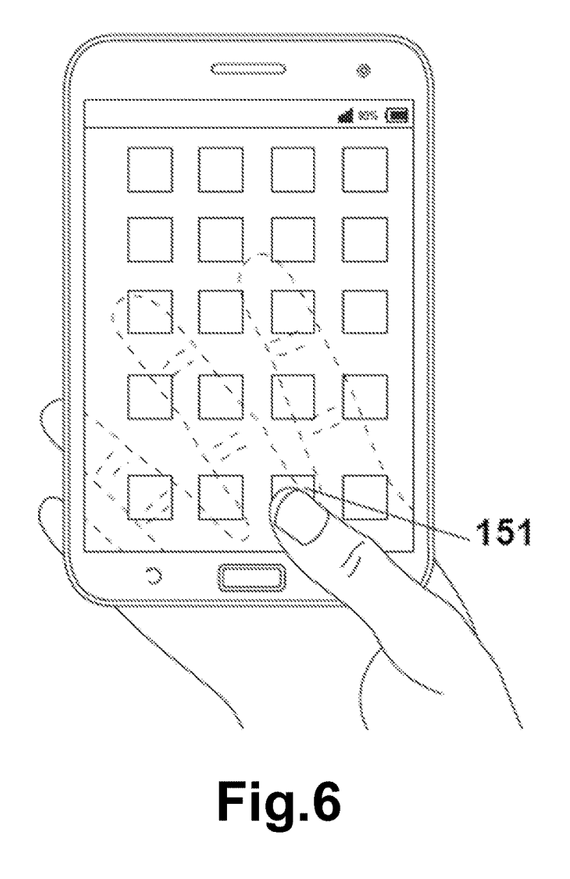
FIG. 6 illustrates a home screen with an icon touched by thumb on front side of the touch screen according to one embodiment of the present invention.
Figure 7:
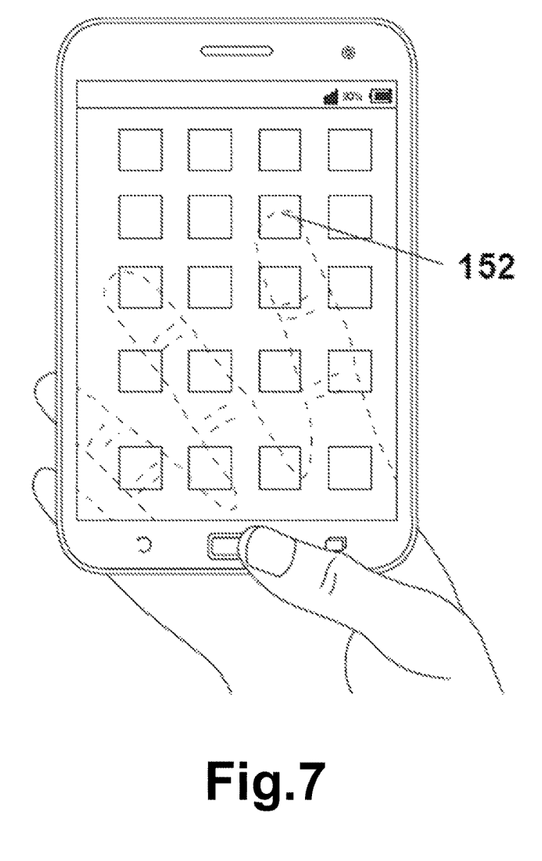
FIG. 7 illustrates a home screen with an icon touched by index finger on rear side of the touch screen according to one embodiment of the present invention.

Thus, grouped number of the recurred number of the phone records can be described as follows:

Grouped number of the recurred number phone records=(total number of the phone records)/ (recurring number of the phone records) plus one The portable device 100 of the present disclosure includes a display 132 with a front side touch panel 125. As shown in FIGS. 6 and 7, the multiple functional icons, such as 4×5 array icons, can be displayed on a display 132 of the portable device 100. A background image is displayed on the front display 132 and pluralities of icons are displayed on the background image. The icons may correspond to various applications. When an icon is selected by the user, the controller executes the corresponding application and displays a corresponding execution screen on the display 132.

The front side touch panel 125 can support multiple functional icons. The portable device 100 further includes a rear side touch panel 126 which is employed for rear side input control signal by finger (index finger or middle finger) of the user from the rear side of the portable device 100.

The base screen contains icons representing applications. Each icon is represented by an image based on its respective application. For example, an image of the icon may represent a mobile phone, a short message service, an e-mail, Line (Instant Message), facebook (social utility), address book, video (movie), photographing, etc.

Figure 8:
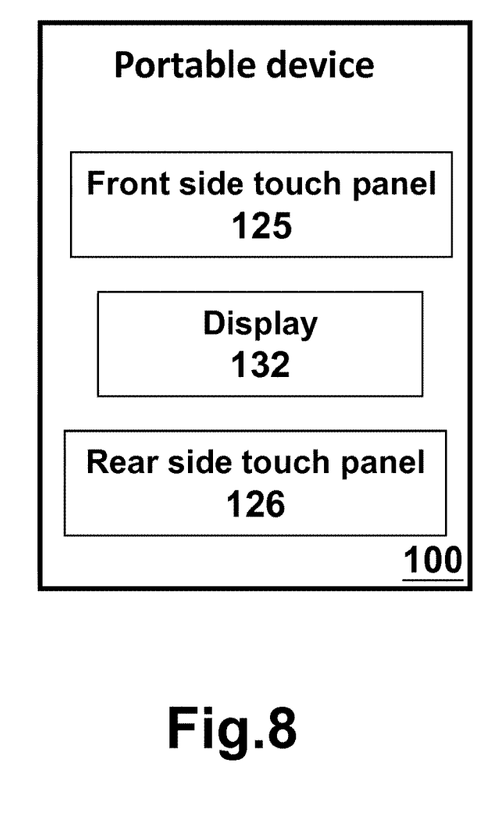
FIG. 8 illustrates a portable device with a display panel, a front touch panel and a rear touch panel according to one embodiment of the present invention.
Figure 9:
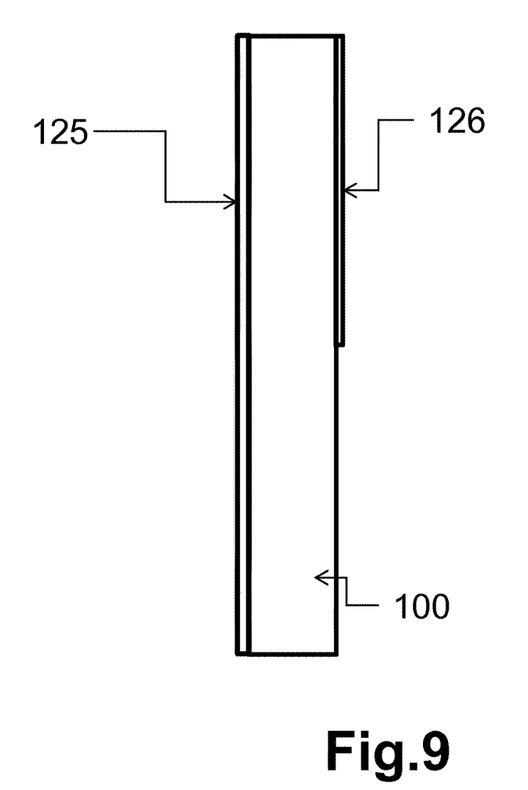
FIG. 9 illustrates a front touch panel and a rear touch panel of a portable device according to one embodiment of the present invention.

The present invention includes a front side touch panel 125 on a display panel 132 and a rear side touch panel 126, as shown in FIG. 8 and FIG. 9. The control unit detects a touch input from (via) the front side touch panel 125 and/or the rear side touch panel 126. The front side touch panel 125 is used to detect a touch input corresponding to the front side input, and the rear side touch panel 126 is used to detect a touch input corresponding to the rear side input. In one embodiment, the front side touch panel 125 is formed over the display 132 and the rear side touch panel 126 is formed on a rear shell surface of the portable device. Alternatively, they may be both placed on the same display panel 132. In the situation, the display is flexible and can be bent. In one embodiment, the front side touch panel 125 and the rear side touch panel 126 may be implemented as an add-on type in which the front touch panel and the rear touch panel are respectively placed on the front and the rear of the display panel 132. In one embodiment, the front side touch panel 125 and the rear side touch panel 126 may be implemented as an on-cell type or an in-cell type in which the front side touch panel and the rear side touch panel are inserted into the display panel 132.

In another embodiment, the front side touch panel 125 is configured to detect a touch input corresponding to a front side of the portable device 100 (or display panel 132), and the rear side touch panel 126 is configured to detect a touch input corresponding to a rear side of the portable device 100 (or display panel 132).

When a user performs a touch input with a hand which is holding the portable (mobile) device 100, a thumb of the corresponding hand touches a front side of the touch screen, and an index finger or a middle finger touches a rear side of the touch screen, as shown in FIGS. 6 and 7. The thumb is placed on a lower portion of the touch screen relative to an index finger and a middle finger. A touch input method and the mobile device of the present disclosure have been conceived. For example, the icon 151 adjacent to the thumb of the corresponding hand may be touched on front side of the touch screen via the front side touch panel 125 by the thumb for activating the function of the icon 151 displayed on the display panel 132, shown in FIG. 7. For another example, the icon 152 away from the thumb of the corresponding hand may be touched on rear side of the touch screen via the rear side touch panel 126 by the index finger or the middle finger for activating the function of the icon 152 displayed on the display panel 132, shown in FIG. 8.

In the present disclosure, the control unit 101 determines one of multiple icons of the touch screen for operation in response to a touch input from the front side touch panel 125 or the rear side touch panel 126, and controls the touch screen to display the icon of the touch input. The function of the identical icon displayed on the display panel 132 may be activated by touching a first touch area of the front side touch panel 125 or touching a second touch area of the rear side touch panel 126. The second touch area is corresponding (mapping) to the first touch area in a direction vertical to the display (normal line of the display surface). For example, size of the second touch area may be designed to the same as the first touch area, or shift a distance to the first touch area, or scaling to the first touch area with a ratio. In one embodiment, touch area of the front side touch panel 125 is configured substantially overall front surface of the portable device 100, touch area of the rear side touch panel 126 is designed on half-upper portion of rear surface of the portable device 100, as shown in FIG. 9.

A touch signal in response to a touch input corresponding to the front side touch panel 125 or the rear side touch panel 126 may be sent to the control unit 101 via an analog to digital conversion. In addition, the control unit 101 detects a movement of a touch from the front side touch panel 125 or the rear side touch panel 126, for example, when the touch coordinate has converted from first position into second point. The control unit 101 calculates the position change amount of the touch in response to the movement of the touch. The movement of the touch may be used to perform the function of page turning or page scrolling on the display. For example, the left-right movement of the touch of the front side touch panel 125 or the rear side touch panel 126 is used for page turning on the touch screen, and up-down movement of the touch of the front side touch panel 125 or the rear side touch panel 126 is used for page scrolling on the touch screen.

Based-on the above description, a method of initiating a virtual icon on a front display by a rear side input for a portable device is provided. Firstly, it providing a front display 132 capable of displaying multiple icons, a front side touch panel 125 formed over the front display 132 and configured to detect a front side touch input signal corresponding to a front side of the display 132, and a rear side touch panel 126 formed on a rear surface of the portable device 100 and configured to detect a rear side touch input corresponding to a rear side of the portable device 100. Next, rear side touch input signal from the rear side touch panel is detected. Subsequently, coordinates of the rear side touch input signal is analyzed by a control unit 101 configured to control the multiple icons on the front display 132. Then, one of the multiple icons is initiated for operation in response to the rear side touch input signal from the rear side touch panel 126 when the initiated icon is mapped with the coordinates.

In other words, the control unit 101 of the portable device 100 can monitor a touch input on the front side touch panel 125 or the rear side touch panel 126 (of touch screen) to determine whether a touch signal indicates that a user is likely to bring the touch screen of the portable device 100 entering into a specified icon, page turning or page scrolling. Upon detecting a touch signal, which represents an explicit request, command, or instruction to operate the portable device 100, it causes the control unit 101 to execute the command signal. Thus, a command signal is provided in response to a depressed touch on the touch screen, which can be controlled by the control unit 101.

In this disclosure, a communication record recurring module 141 is coupled to the control unit 101 and being capable of recurring communication records of the portable device 100. In this disclosure, a rear side touch panel 126 is coupled to the control unit 101 for rear side input to control the communication record recurring module 141.

The portable device 100 may be a cell phone, a smart phone, a tablet PC, a digital camera, or a Personal Digital Assistant.

Figure 10:
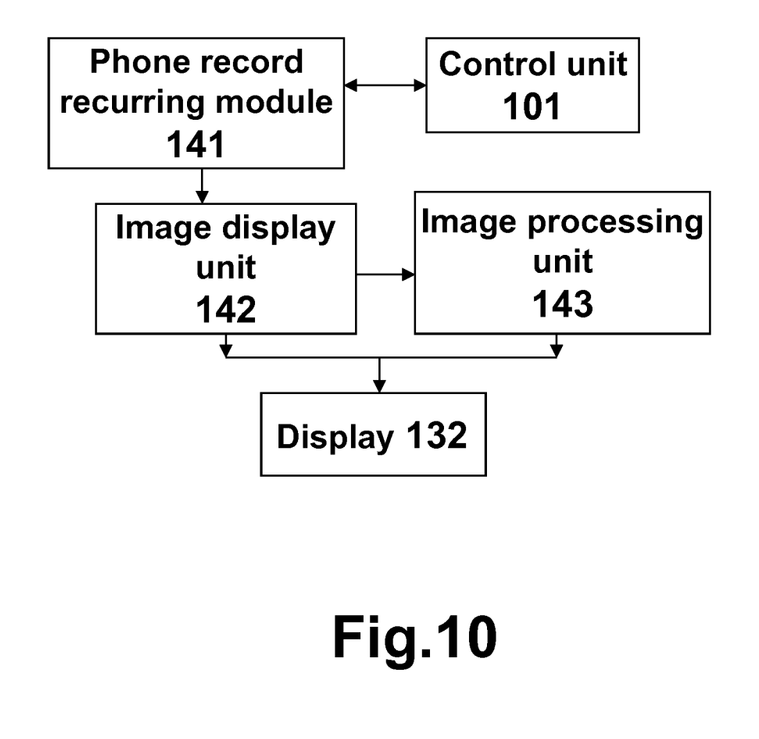
FIG. 10 illustrates a block diagram showing some components of the portable device according to one embodiment of the present invention.

Please turn to FIG. 10, the present invention also includes a communication record recurring module 141 coupled to the control unit 101. The communication record recurring module 141 is coupled to an image display unit 142. In general, the control unit 101 of the portable device 100 can monitor inputs from a touch screen 121 to determine whether a group of the recurred number phone records is selected.

As a group of the recurred number phone records is selected, the image display unit 142 is then noticed for showing the specified image of the phone records on the touch screen 121 of the display 132 by the communication record recurring module 141 or the control unit 101.

In one embodiment, the image can be processed by the image processing unit 143 before sending the image data signals to the display 132. In one embodiment, the image processing unit 143 maybe employed to adjust the on-screen image before displaying.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A portable device, comprising:
   a control unit;
   a display coupled to said control unit;
   a touch screen capable of supporting multiple functional icons;
   a memory coupled to said control unit, wherein said memory includes communication records; and
   a communication record recurring module coupled to said control unit to determine a pre-determined number phone records of said communication records of said portable device to cause said display to display said pre-determined number phone records recurred by page scrolling up or down on said touch screen.

2. The portable device as set forth in claim 1, wherein recurring number of said communication records is set as a per-determined number.

3. The portable device as set forth in claim 2, wherein said communication records include phone records.

4. The portable device as set forth in claim 1, further comprising a microphone coupled to said control unit.

5. The portable device as set forth in claim 1, further include a wireless data transferring module coupled to said control unit.

6. The portable device as set forth in claim 1, further comprising a network phone module including an internet communication module coupled to said control unit to transmit or receive data through a local area network module.

7. The portable device as set forth in claim 1, further includes an image capture module coupled to said control unit.

8. The portable device as set forth in claim 1, further comprising an image display unit coupled to said communication record recurring module and said display.

9. The portable device as set forth in claim 1, wherein total number of said communication records is grouped as multiple groups recurred number phone records.

10. The portable device as set forth in claim 1, wherein said portable device is a cell phone, a smart phone, or a tablet.

11. A portable device, comprising:
    a control unit;
    a display having a front side touch panel and being coupled to said control unit;
    a touch screen capable of supporting multiple functional icons;
    a memory coupled to said control unit, wherein said memory includes communication records;
    a rear side touch panel coupled to said control unit for rear side input to control said communication record recurring module;
    a communication record recurring module coupled to said control unit to determine a pre-determined number phone records of said communication records of said portable device to cause said display to display said pre-determined number phone records recurred by page scrolling up or down on said touch screen.

12. The portable device as set forth in claim 11, wherein recurring number of said communication e records is set as a per-determined number.

13. The portable device as set forth in claim 12, further comprising a microphone coupled to said control unit.

14. The portable device as set forth in claim 11, further includes a wireless data transferring module coupled to said control unit.

15. The portable device as set forth in claim 11, wherein said communication records include phone records.

16. The portable device as set forth in claim 11, further comprising a network phone module including an internet communication module coupled to said control unit to transmit or receive data through a local area network module.

17. A portable device, comprising:
    a control unit;
    a display having a front side touch panel and being coupled to said control unit;
    a touch screen capable of supporting multiple functional icons;
    a memory coupled to said control unit, wherein said memory includes communication records, a most recent record of said communication records is arranged at the lower portion of said display; and
    a communication record recurring module coupled to said control unit to determine a pre-determined number phone records of said communication records of said portable device to cause said display to display said pre-determined number phone records recurred by page scrolling up or down on said touch screen.

18. The portable device as set forth in claim 17, wherein said communication records include phone records.

19. The portable device as set forth in claim 17, wherein recurring number of said phone records is set as a per-determined number.

20. The portable device as set forth in claim 17, wherein total number of said communication records is grouped as multiple groups recurred number phone records.

* * * * *